United States Patent
Kim et al.

(10) Patent No.: US 7,169,456 B2
(45) Date of Patent: Jan. 30, 2007

(54) TRANSCRIPTION PLATE FOR FORMING ORIENTATION LAYER

(75) Inventors: Hyang Yul Kim, Kyoungki-do (KR); Sung Hun Song, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 343 days.

(21) Appl. No.: 10/641,497

(22) Filed: Aug. 15, 2003

(65) Prior Publication Data

US 2004/0038010 A1    Feb. 26, 2004

(30) Foreign Application Priority Data

Aug. 19, 2002   (KR) .................. 10-2002-0048801

(51) Int. Cl.
*B32B 7/00*    (2006.01)
*B41N 1/00*    (2006.01)

(52) U.S. Cl. ............... 428/119; 428/120; 428/192; 101/395; 101/401.1

(58) Field of Classification Search .............. None
See application file for complete search history.

(56) References Cited

U.S. PATENT DOCUMENTS 5,894,799 A * 4/1999 Bart et al. ............... 101/376
6,382,099 B1 * 5/2002 Herrmann ............... 101/211
6,829,995 B1 * 12/2004 Hany .................. 101/463.1

FOREIGN PATENT DOCUMENTS

JP    06-305115    * 11/1994

* cited by examiner

*Primary Examiner*—Jennifer C. McNeil
*Assistant Examiner*—Timothy M. Speer
(74) *Attorney, Agent, or Firm*—Ladas & Parry LLP

(57) ABSTRACT

Disclosed is a transcription plate for forming orientation layer by coating printed orientation agent onto a substrate. The transcription plate comprises a base film and photosensitive resin plate, such as an APR layer, wherein a number of dots are arranged on the photosensitive resin plate in a regular fashion, and an arrangement of outer dots disposed outside of an active area of the transcription plate is denser than that of inner dots disposed within an active area of the transcription plate. The transcription plate enables the thickness of the orientation layer along the edge outside of the active layer of the transcription plate to be formed with the uniform thickness. Therefore, a uniform image property can be obtained by uniform rubbing. Further, because such phenomenon as conglomeration of the orientation agent does not occur, non-uniformity of cell gaps, which is caused by the superposition on the sealing line, can be solved.

6 Claims, 3 Drawing Sheets

TRANSCRIPTION PLATE FOR FORMING ORIENTATION LAYER

BACKGROUND OF THE INVENTION

1. Field of the Invention

The present invention relates to a transcription plate for forming an orientation layer for a liquid crystal display, and more particularly to a transcription plate capable of forming the orientation layer with uniform thickness.

2. Description of the Prior Art

As generally known in the art, a liquid crystal display presents an image by making use of the optical properties of liquid crystal, which vary according to application of voltage. The liquid crystal display comprises a liquid crystal panel including a pair of substrates and liquid crystal filled into a space formed there between; and a printed circuit board for applying electrical signal to the liquid crystal panel.

In the liquid crystal display, molecules of liquid crystal should be aligned in a certain direction so as to obtain uniform brightness and high contrast ratio. For the purpose of aligning the molecules of the liquid crystal in a certain direction, an orientation layer has been formed by coating an orientation agent, such as polyimide onto inner surfaces of the substrates.

FIG. 1 is a perspective view of a conventional apparatus for coating orientation layer.

Referring to FIG. 1, a dispenser 50 and an Anilox roll 30 is shown. Using the dispenser 50, the orientation agent, such as polyimide is applied onto the Anilox roll 30. Here, the polyimide can be coated on the Anilox roll 30 with thinness and uniformity with an aid of a doctor blade 40. Afterward, the coated polyimide is printed onto a transcription plate 60 with a predetermined pattern, such as an Asahi Kasei photosensitive resin plate (APR plate), and then the polyimide printed on the transcription plate 60 is coated on the substrate 10 to form the orientation layer by the rotating action of coating roll 20.

As such, there must be provided a transcription plate (i.e., APR plate; Asahi Kasei Photosensitive resin plate) made from polymer material in order to form the orientation layer.

FIG. 2 is a plan view and a front view of a conventional transcription plate for forming an orientation film. FIG. 3 is a cross-sectional view of an orientation layer formed by the transcription plate for forming orientation layer according to the prior art.

As shown in FIG. 2, the conventional transcription plate for forming the orientation layer is a two-layered type including a base film 62 made from rubber material and a photosensitive resin plate such as an APR layer 64. The number of dots per line is 400 per an inch. Here, a diameter d of dot 66 is about 42 μm and a pitch between dots 66 is about 62 μm. Those dimensions are same over the whole area of the substrate, regardless of being within or outside of the active area defined by a phantom line.

Referring to FIG. 3, using the transcription plate 60 on which the orientation agent 70, such as polyimide is printed, the orientation agent 70 is coated onto the active area 12 of the substrate 10 to form the orientation layer 14.

However, the transcription plate for forming orientation layer according to the prior art includes such problems as listed below.

In the prior art, when forming the orientation layer on the substrate, the greater coating pressure acts upon an edge area of the transcription plate than any other area. Here, the coating pressure corresponds to the pressure between the transcription plate and the substrate and presents a degree of pressure on the substrate by the transcription plate.

Accordingly, as shown in FIG. 3, a thickness of the orientation layer formed along an edge area A of the transcription plate tends to become relatively greater than any other area. As such phenomenon development, it leads to the conglomeration of the orientation agent. As a result, a cell gap enlarges within an area where the edge area A outside of the active area 12 of the transcription plate overlaps with to a sealing line (not shown), thereby resulting in a defective cell gap.

SUMMARY OF THE INVENTION

Accordingly, the present invention has been made to solve the above-mentioned problems occurring in the prior art, and an object of the present invention is to provide an improved transcription plate for forming orientation layer, wherein the number of dots per line outside of the active area increase so as to reduce volume of orientation agent printed thereon. By doing so, it is possible to form the orientation layer with uniform thickness on the substrate even if the strong coating pressures exerts upon the edge of the transcription plate.

In order to accomplish this object, there is provided a the transcription plate comprising a base film and a photosensitive resin plate such as an APR layer, wherein a number of dots are arranged on the photosensitive resin plate such as an APR layer in a regular fashion, and an arrangement of outer dots disposed outside of an active area of the transcription plate is denser than that of inner dots disposed within an active area of the transcription plate.

According to a feature of the present invention, thickness of the orientation layer can be formed with uniformity regardless of being within or outside of an active area.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
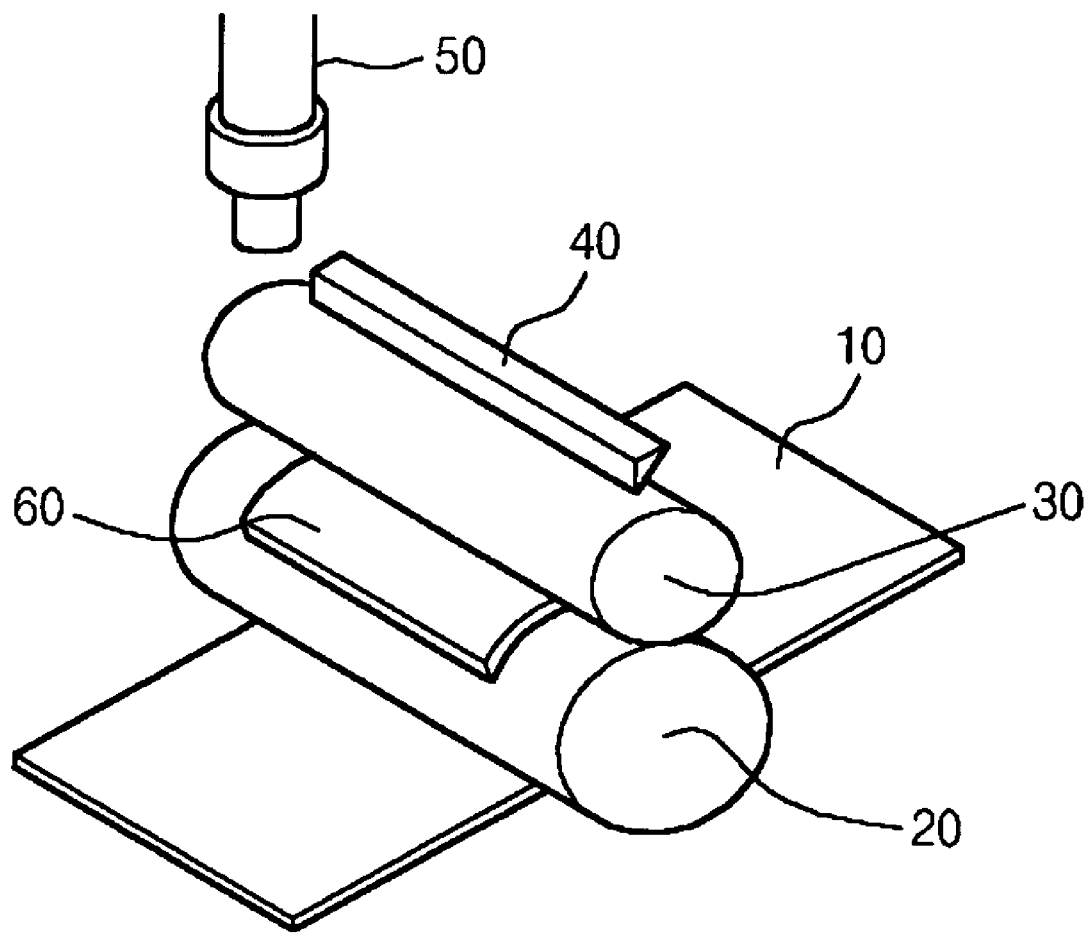
FIG. 1 is a perspective view of a conventional apparatus for coating orientation layer.
Figure 2:
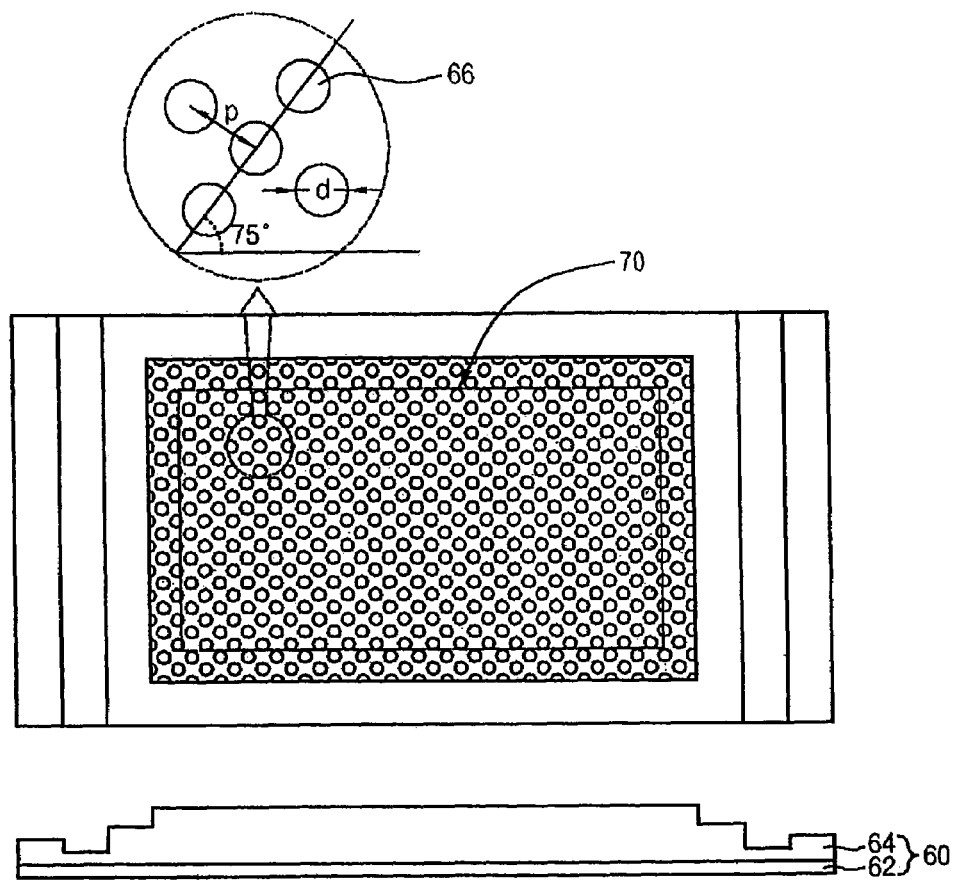
FIG. 2 is a plan view and a front view of a transcription plate for forming orientation layer according to the prior art.
Figure 3:
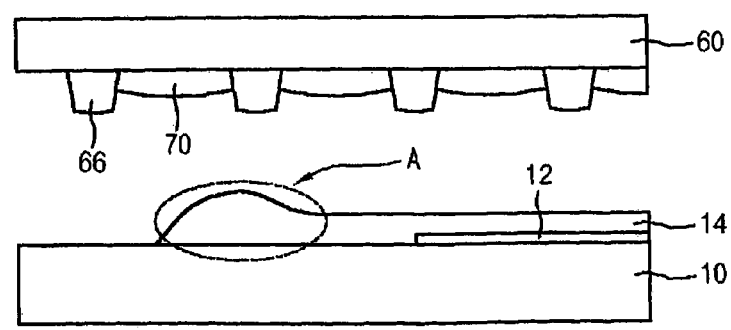
FIG. 3 is a cross-sectional view of orientation layer formed by the transcription plate for forming orientation layer according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 4:
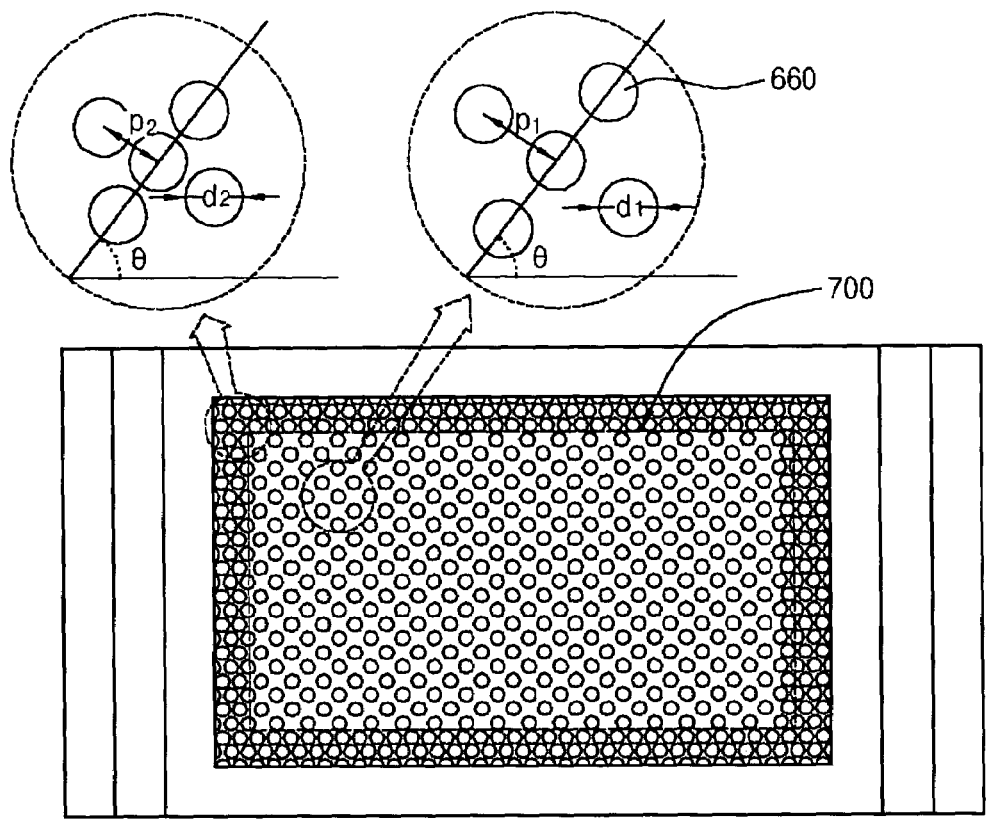
FIG. 4 is a plan view and a front view of a transcription plate for forming orientation layer according to the present invention.
Figure 4:
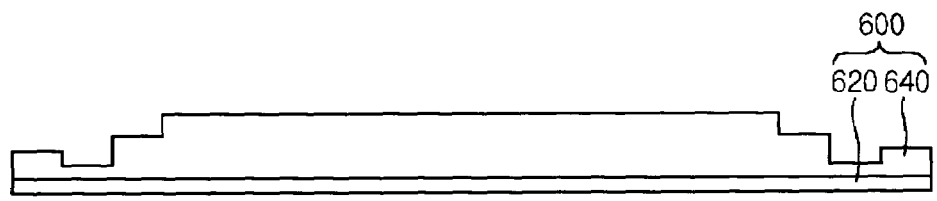
Figure 5:
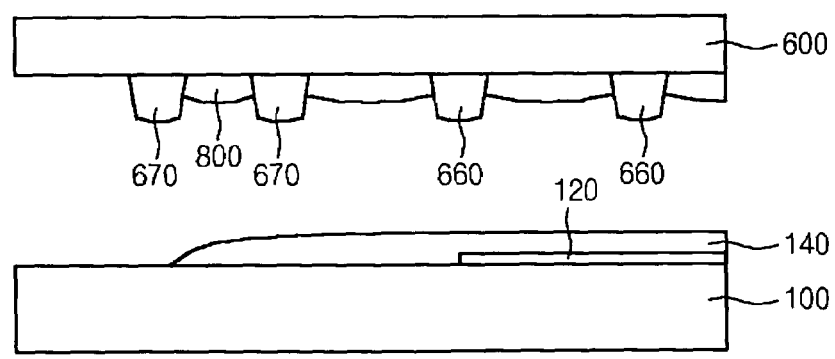
FIG. 5 is a cross-sectional view of the orientation layer formed by the transcription plate for forming the orientation layer according to the present invention.

FIG. 4 is a plan view and a front view of a transcription plate for forming an orientation layer of the present invention. FIG. 5 is a cross-sectional view of an orientation layer formed by using a transcription plate for forming an orientation layer of the present invention.

Referring to FIG. 4, a transcription plate for forming orientation layer of the present invention has a two-layered structure including a base film 620 made from polyester material and a photosensitive resin plate such as an APR layer 640 made from unsaturated poly-butadiene resin. A thickness of the base film 620 is about 0.25 mm and a total thickness of the transfer film is about 2.85 mm.

A number of dots 670 and 660 are regularly arranged on the photosensitive resin plate such as an APR layer 640. Here, the arrangement of outer dots 670 disposed outside of an active area, which is defined by a phantom line 700, is denser than that of inner dots 660 disposed within the active area.

A diameter d1 of the inner dots 660 equals to that d2 of the outer dots 670, both of which are 42 μm. However, a pitch between the inner dots 660 is 62 μm, while the pitch between the outer dots 670 is 45 μm.

Accordingly, on the transcription plate 600, the number of dots outside of the active area is greater than that within the active area, so that the number of dots per line for the outer dots, i.e., a ratio of convex area to the total area for the outer dots becomes larger than that for the inner dots.

For instance, the number of dots per line is about 400 per an inch for the inner dots 600, so that the ratio of the convex dot area to the total area is about 36%, while the number of dots per line is more than 400 for the outer dots 670, preferably being about 560, so that the ratio of the convex dot area to the total area is more than 36%, preferably being about 68%.

An angle θ1 of an inner dot line and an angle θ2 of an outer dot line are each about 75°, each of which is determined by taking account of the optimal angle for exchanging polyimide with an Anilox roll (not shown).

On the other hand, an area formed by the outer dots 670 spans from a border of the active area to an edge of the orientation layer. For instance, width of the area formed by the outer dots 670 may range between 1 mm and 6 mm.

As shown in FIG. 5, orientation agent 800 is coated onto the active area 120 of a substrate 100 so as to form a orientation layer 140 using the transcription plate 600, on which the orientation agent 800, such as polyimide is printed.

As explained herein above, because the distance between the outer dots 670 outside of the active area is shorter than that of the inner dots 660 within the active area, the quantity of the orientation agent 800 filled between the outer dots 670 can be reduced using the plate 600 of the invention. Consequently, even when a strong coating pressure is exerted on the edge of the transcription plate 600, almost the same quantity of the polyimide can be transferred to a whole area of the substrate 100 whether it is the within or the outside of the active area 120. Thus, the thickness of the orientation layer 140 on the substrate 100 can be uniformly formed whether it is within or outside of the active area 120.

As stated before, the thickness of the orientation layer along the edge outside of the active layer of the transcription plate can be formed with the uniform thickness using the transcription plate for forming orientation layer according to the present invention. As a result, a uniform image property can be obtained by uniform rubbing.

Further, because such phenomenon as conglomeration of the orientation agent does not occur, non-uniformity of cell gaps, which is caused by the superposition on the sealing line, can be solved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A transcription plate for forming orientation layer by coating printed orientation agent onto a substrate, the transcription plate comprising:
   a base film and photosensitive resin layer, wherein a number of dots are arranged on the photosensitive resin layer in a regular fashion, and an arrangement of outer dots disposed outside of an active area of the transcription plate is denser than that of inner dots disposed within said active area of the transcription plate.

2. A transcription plate for forming an orientation layer as claimed in claim 1, wherein the number of dots per line is about 400 per an inch for the dots within said active area (i.e., inner dots), while the number of dots per line is about 560 per an inch for the dots outside said active area (i.e., outer dots).

3. A transcription plate for forming orientation layer as claimed in claim 2, wherein a diameter of the inner dots is 42 μm and a pitch between the inner dots 62 μm, while the diameter of the outer dots is 42 μm and the pitch between the outer dots is 45 μm.

4. A transcription plate for forming orientation layer as claimed in claim 2, each of the inner dots and the outer dots have dot lines have dot lines having an angle of 75°.

5. A transcription plate for forming orientation layer as claimed in claim 2, an area in which the outer dots are extended from a border of the said first area to the edge of the transcription plate.

6. A transcription plate as claimed in claim 1, wherein the photosensitive resin layer is comprised of a layer of unsaturated poly-butadiene resin.

* * * * *